United States Patent [19]
Rinesch

[11] 3,802,682
[45] Apr. 9, 1974

[54] METHOD FOR CONTINUOUSLY REFINING PIG IRON AND PLANT FOR CARRYING OUT SUCH METHOD

[75] Inventor: Rudolf Rinesch, Dinz, Austria

[73] Assignee: Vereinigte Osterreichische Eisen-und Stahlwerke Aktiengesellschaft, Linz, Austria

[22] Filed: Jan. 23, 1973

[21] Appl. No.: 326,048

Related U.S. Application Data
[62] Division of Ser. No. 63,061, Aug. 12, 1970, abandoned.

[30] Foreign Application Priority Data
Aug. 19, 1969 Austria .............................. 7925/69

[52] U.S. Cl. ..................................... 266/35, 75/60
[51] Int. Cl. ............................................. C21c 7/00
[58] Field of Search .......... 266/34 R, 35; 75/46, 51, 75/52, 60, 61

[56] References Cited
UNITED STATES PATENTS
3,356,490  12/1967  Muller et al. .......................... 75/60

*Primary Examiner*—Gerald A. Dost
*Attorney, Agent, or Firm*—Brumbaugh, Graves, Donohue & Raymond

[57] ABSTRACT

The invention proposes a method for continuously refining pig iron in a refining vessel, in which an oxygen-containing refining gas is blown onto the liquid pig iron from above by means of a blowing lance, in which the improvement resides in that the liquid pig iron is introduced into the refining vessel through a floor opening, the blowing lance being arranged above the floor opening, so that the pig iron gets into contact with the refining gas immediately after its entering the refining vessel. This method guarantees an absolutely uniform refining effect.

2 Claims, 1 Drawing Figure

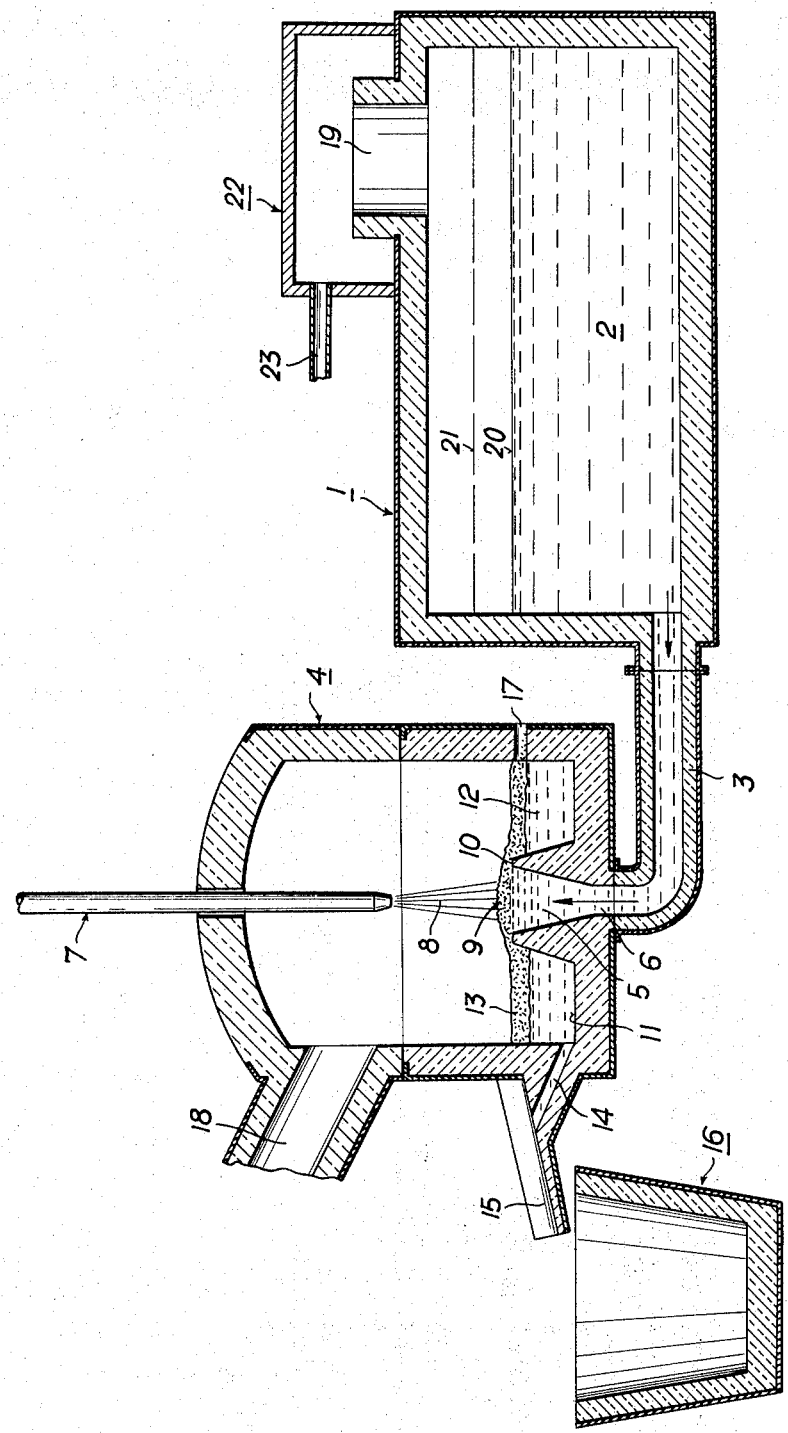

METHOD FOR CONTINUOUSLY REFINING PIG IRON AND PLANT FOR CARRYING OUT SUCH METHOD

This is a division, of application Ser. No. 63,061 filed Aug. 12, 1970, and now abandoned.

The invention relates to a method for continuously refining pig iron in a refining vessel, in which an oxygen-containing refining gas, preferably pure oxygen, if desired together with fine-granular slag formers, such as lime, fluorspar and the like, and a fine-granular coolant, such as ore, limestone, iron powder and the like, is blown onto the liquid pig iron from above by means of a blowing lance, and to a plant for carrying out such method.

Numerous proposals of methods for continuously converting pig iron into steel and for pre-refining pig iron, respectively, have become known. It has been attempted to refine pig iron running from a blast furnace over gutters by blowing oxygen onto it. The current cross section in such gutters is relatively small and subjected to variations so that it is not possible to uniformly charge the pig iron with the refining agent; also, the reaction temperature is rather high so that the refractory lining of the gutters will be destroyed. When several blowing nozzles are arranged along the gutters the expenditure for the equipment is increased but still the refining effect is not uniform. The problem of guiding off and dust extracting the refining gases can be solved only under great difficulties and by employing highly expensive equipment which, however, are responsible for a considerable hampering in the operation of a blast furnace plant.

It has also been proposed to spray liquid pig iron under use of an oxidizing spray gas. Experience has shown that it is difficult to achieve a uniform distribution of the pig iron into minute droplets. The refining effect is uneven. It is very difficult to influence or control the progress of the reaction.

According to another proposal for continuously refining pig iron, the pig iron is guided into a refining vessel in which a deep sump is formed, a refining agent is blown onto the pig iron and the refined metal is permitted to flow out. In this method too, the operational conditions cannot be controlled because an exact correlation between the amounts of pig iron flowing into the vessel and of refined metal flowing out of it and the amount of refining agent for blowing onto the iron is not feasible. The pig iron which flows into the refining vessel is not evenly charged with the refining agent and thus it is impossible to achieve a uniform refining effect, so that, naturally, analyses of the finished metal melt show varying results.

The invention avoids these disadvantages and difficulties in that in a method of the kind described in the introduction, the liquid pig iron is introduced into the refining vessel through a floor opening, the blowing lance being arranged above the floor opening, so that the pig iron gets into contact with the refining gas immediately after its entering the refining vessel.

Preferably the pig iron is fed into the refining vessel through the floor opening under pneumatic pressure from a storage vessel.

Suitably a temperature of about 1,700° C is maintained in the reaction zone of the refining vessel by appropriate choice of blowing conditions and dosage of coolants.

In a preferred embodiment of a plant for carrying out the method according to the invention, comprising a refining vessel, a blowing lance centrally arranged therein, a tap for the produced steel, a tap for the slag and a gas off-take, a central floor opening is provided in the floor of the refining vessel for introducing liquid pig iron, the floor opening being surrounded by an annular barrier of refractory material forming two concentrical reaction spaces, the liquid metal getting from the inner reaction space into the outer reaction space by flowing over the barrier.

Suitably, the floor opening of the refining vessel is communicating with the pig iron storage vessel via a conduit, the filling opening of the pig iron storage vessel being gas-tightly covered by a releasable hood connectable to a pneumatic pressure conduit.

In order that the invention may be more fully understood it shall now be described with reference to the accompanying drawing.

The drawing shows a plant according to the invention schematically, in a vertical sectional view.

A pig iron storage vessel 1 holding liquid pig iron 2 is connected via a conduit 3 with a refining vessel 4. The refining vessel 4 has a central floor opening 6 which is surrounded by an annular barrier 10 conically widening in upward direction and made of refractory material. The annular barrier 10 forms two concentrical reaction spaces 5, 12 in the refining vessel 4. A vertical blowing lance 7 for the supply of the refining gas together with fine-granular slag formers, e.g. lime, fluorspar, and fine-granular coolants such as ore, limestone, iron powder is arranged above the floor opening 6 and the inner reaction space 5; the blowing steam emanating from the blowing lance 7 is denoted with numeral 8. The axis of the blowing lance 7 coincides with the axis of the floor opening 6 so that the pig iron is introduced into the refining vessel 4 in vertical direction, indicated by the arrow, from below, and immediately gets into contact with the refining gas, the slag formers and the coolants. The pig iron is refined in the innter reaction space 5 under formation of a reaction zone 9 and runs over the barrier 10 into the outer reaction space 12 passing thereby a slag layer 13. This means that another reaction with the slag is taking place in the reaction space 12. The produced steel is collected in the outer reaction space 12 and flows from there through the tap 14 over the gutter 15 into a ladle 16. The slag flows off via the tap 17. The taps 14, 17 are arranged at such heights that the level of the melt in the outer reaction space 12 lies below the upper margin of the annular barrier 10. The refining gases escape through the chimney flue 18 which is connected with a plant for utilizing the waste heat and purifying the gas.

By appropriate height adjustment of the blowing lance 7 and choice of the refining gas pressure the diameter of the reaction zone and the reaction conditions in the inner reaction space 5 are influenced in a manner that the pig iron is uniformly refined before it runs over the upper margin of the barrier 10 and that any damage of the barrier is avoided. The diameter of the reaction zone 9 is advantageously kept somewhat smaller than that of the barrier-top annulus.

The pig iron container 1 is filled with pig iron through an opening 19 to about the level 20 which lies substantially in the height of the upper margin of the barrier 10. Then the filling opening 19 is gas-tightly covered by a hood 22 and pressurized air is blown in through the conduit 23. The pig iron 2 is fed into the refining vessel 4 via the conduit 3 under pneumatic pressure. It is also possible to arrange the pig iron container 1 below the refining vessel 4 and to connect it therewith by means of an ascending pipe line. The holding capacity of the pig iron container 1 may amount to several thousand metric tons so that in any case a continuous operation is guaranteed. Also, several pig iron containers may be connected with each other by conduits in which suitable stopping means are provided.

Another possibility of feeding pig iron into the refining vessel is realized by adjusting the pig iron surface in the pig iron container 1 to the level 21, which lies above the upper margin of the barrier 10; the pig iron will then flow into the refining vessel 4 as a result of the height difference between the levels 20, 21. In the same measure as pig iron flows from the storage vessel 1 new pig iron has to be added continuously through the filling opening 19.

By adding fine-granular coolants, such as ore, limestone, iron powder and the like, it is possible to adjust the temperature in the reaction zone 9 as desired. It is suitable to keep this temperature below about 1,700° C. The amount of dust which is created during refining is reduced by cooling the reaction zone. This effect is also achieved by a suitable composition of the refining gas which may e.g. be composed of a mixture of free and attached oxygen, such as oxygen and carbon dioxide, oxygen, carbondioxide and water steam and the like.

What I claim is:

1. A plant for continuously refining pig iron to steel, comprising a refining vessel, a blowing lance centrally arranged therein and connected to means for supplying refining gas and admixtures, a tap for the produced steel, a tap for slag and a gas off-take provided in said vessel, and further comprising a central floor opening in said refining vessel, means connected to said floor opening for continuously feeding liquid pig iron into said refining vessel, an annular barrier of refractory material surrounding said floor opening and projecting into said vessel to form concentrical inner and outer reaction spaces therein, the liquid pig iron getting from the inner reaction space into the outer reaction space by flowing over said barrier.

2. The plant set forth in claim 1, wherein the floor opening of the refining vessel is communicating via a conduit with a pig iron storage vessel having a filling opening which is gas-tightly covered by a releasable hood which, in turn, is connectable with a pneumatic pressure conduit.

* * * * *

PO-1050
(5/69)

UNITED STATES PATENT OFFICE
CERTIFICATE OF CORRECTION

Patent No. 3,802,682                    Dated Apr. 9, 1974

Inventor(s) Rudolf Rinesch

It is certified that error appears in the above-identified patent and that said Letters Patent are hereby corrected as shown below:

First page, Item [75], "Dinz" should be --Linz--;

Col. 2, line 33, "steam" should read --stream--; and

Col. 2, line 40, "innter" should read --inner--.

Signed and sealed this 3rd day of September 1974.

(SEAL)
Attest:

McCOY M. GIBSON, JR.
Attesting Officer

C. MARSHALL DANN
Commissioner of Patents